Patented Mar. 10, 1942

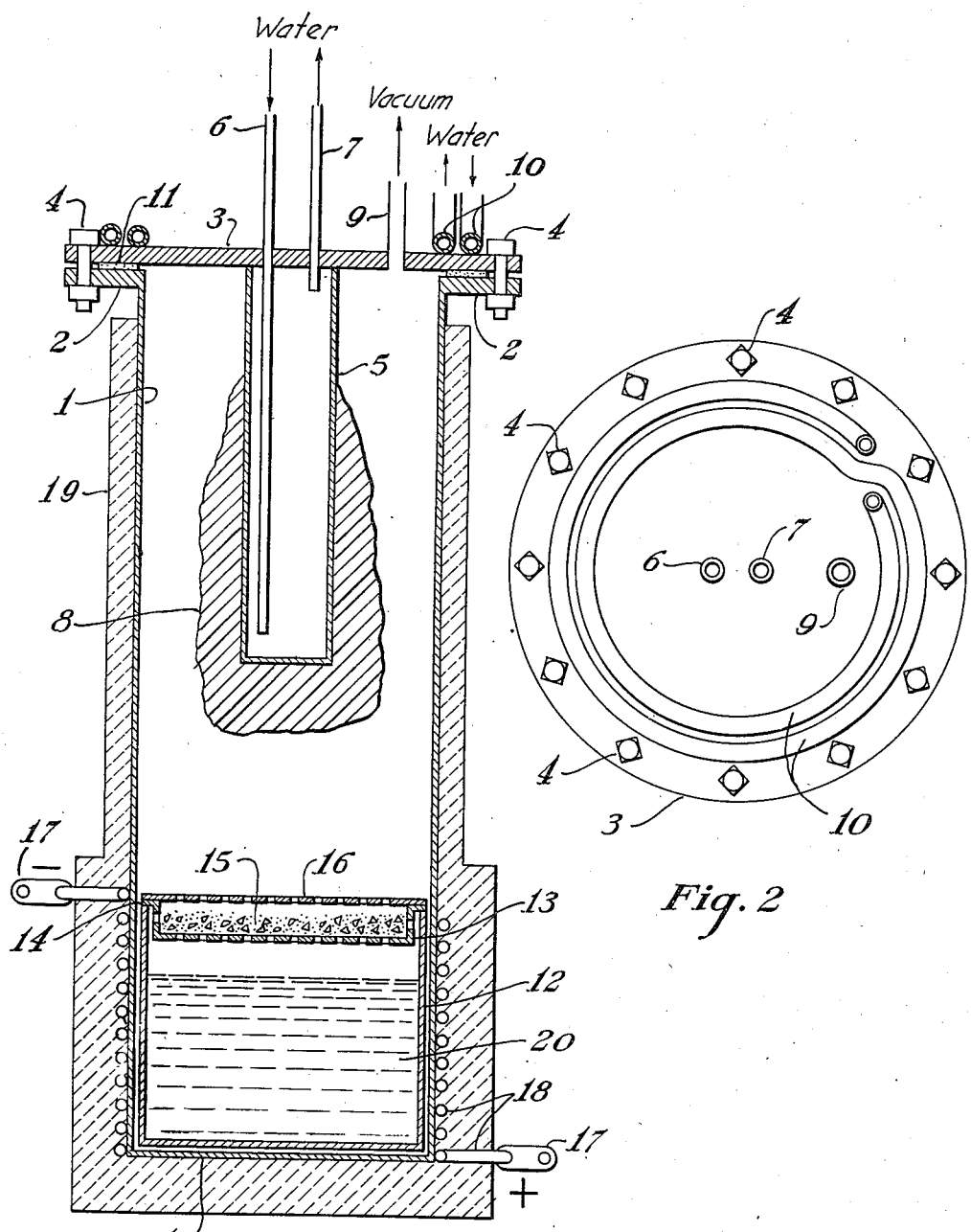

2,276,239

UNITED STATES PATENT OFFICE 2,276,239

METHOD OF TREATING MAGNESIUM

Charles E. Nelson, Midland, Mich., assignor to The Dow Chemical Company, Midland, Mich., a corporation of Michigan Application December 26, 1940, Serial No. 371,649

4 Claims. (Cl. 75—67)

This invention relates to the treatment of magnesium. It more particularly concerns a method of treating commercial magnesium, whereby it is rendered highly pure, or the magnesium in magnesium scrap, such as castings, alloys, and the like, can be recovered in a highly pure state.

I have found that the presence of certain impurities in magnesium, even though these be present in very limited amounts, adversely affects both the chemical and physical properties of magnesium. For example, it is recognized that the presence of a very small amount of iron in magnesium greatly accelerates the rate at which magnesium corrodes, and may thus render it unsuitable for many commercial uses. The impurities nickel and copper similarly affect the rate at which magnesium metal corrodes, while other impurities, such as the oxides of magnesium and calcium, generally affect the physical properties.

To remove impurities ordinarily present in the magnesium produced by present practices, it has heretofore been proposed to subject the magnesium to sublimation or distillation. However, I have observed that unless the metal being purified is subjected to repeated sublimation or distillation, as the case may be, the impurities are not generally removed to the extent that they no longer greatly accelerate the rate at which magnesium corrodes or otherwise adversely affect the properties of the metal. In some instances, even after repeated distillations or sublimations, the metal cannot be rendered satisfactorily pure.

It is, therefore the principal object of the invention to provide a method of treating magnesium whereby the impurities are removed to the extent that they no longer have substantially any adverse affect upon the physical or chemical properties of the metal. Another object of the invention is to provide a method whereby magnesium can be rendered highly pure in a single operation. Other objects and advantages will be apparent as the description of the invention proceeds.

The present invention resides in the discovery that, by passing magnesium vapor through a porous filter-like bed comprising a complex silicate, the impurities are so completely removed from such magnesium as no longer to exert a deleterious effect on the properties of the metal. It has been found that the complex silicates effecting the desired degree of purification are those which react with magnesium vapor at the temperature of the distillation to liberate at least a small amount of an alkali metal in vapor form. The exact relation between the purifying effect and the liberation of the alkali metal is not known but is believed to be due to a scavenging and reducing effect of the alkali metal vapor upon impurities such as the oxides and chlorides, of the metals iron, nickel, and copper, whereby these impurities are reduced to a form not vaporizable at the temperature and conditions of operation. In any event observation has shown that, when a complex silicate which liberates an alkali metal vapor in the presence of magnesium vapor is employed, the desired purification is effected.

The invention, then, consists in the method hereinafter fully described and particularly pointed out in the claims, the accompanying drawing and following description setting forth in detail a mode of carrying out the invention, such mode illustrating, however, but one of various ways in which the principle of the invention may be employed.

In said drawing:

Fig. 1 is a sectional view in elevation of the apparatus.

Fig. 2 is a top plan view of said apparatus.

In the drawing, an upright cylindrical iron retort 1 is shown closed at the bottom 21 and provided at the top end with a flange 2, to which is attached a gasket-sealed head 3 by means of suitable bolts 4. Condenser 5, in the form of a section of iron pipe closed at its lower end, is attached centrally to the interior side of head 3 and extends into the retort. Exteriorly of the retort a cooling water inlet 6 and a water outlet 7 communicate with the interior of condenser 5. A mass of purified condensed magnesium 8 is shown clinging to the condenser 5. A vacuum connection 9 communicates through head 3 with the interior of the retort and provides a means whereby the retort may be connected to a vacuum pump (not shown) and held under reduced pressure. A cooling coil 10, intimately attached to and encircling head 3 directly above gasket 11, serves to prevent the gasket from becoming overheated. Interiorly of the retort a removable iron charge container 12, which is shown partially filled with a charge of molten magnesium 20, rests on the bottom of the retort. A shallow perforate metal basket 13 is shown filled with a complex silicate 15, which acts as the filter through which the magnesium vapor passes. The basket 13 is suspended from charge container 12 by means of flange 14. A perforate cover 16 is provided for basket 13 and serves to confine the complex silicate bed during the purifying operation. As a means of heating the retort, electrical leads 17 are connected to resistance wire 18, which encircles the lower portion of the retort. A suitable insulating material 19 surrounds the retort and serves to protect it from excessive heat loss due to radiation.

In carrying out the method of the invention, the iron container 12 is charged with a batch of impure magnesium metal or alloy thereof and lowered into the retort through the open end. Thereafter a suitable filtering material is placed in the basket 13, which is then positioned on top of charge container 12 with its cover in place. The retort is then closed up by bolting flanged head 3 in place. Cooling water is then started through lines 6 and 7 and through coil 10 while vacuum is applied to exhaust the interior of the retort of gases through line 9. When the desired degree of vacuum is obtained, electric current is supplied to the resistance wire 18 through electrical leads 17 to heat the retort, care being taken in the meantime to maintain the vacuum. The impure magnesium rapidly passes into the vapor state from either the solid or molten metal, depending on the temperature and degree of vacuum at which the process is operated. In any event the magnesium vapor passes directly and rapidly through the filter bed 15 and condenses on the cold surface of condenser 5, where it adheres in the form of compact crystals. After such a time has elapsed as will indicate that substantially all the magnesium has been distilled or sublimed, the current may be shut off, the vacuum connection broken, and the flanged head detached from the retort. The highly pure magnesium crystals can then be stripped from the condenser. After the residue remaining in the charge container has been removed, if desired, additional impure metal may be added to the charge container and the operation of purifying metal repeated.

A complex silicate capable of liberating an alkali metal in the form of a vapor upon contact with magnesium vapor, which has been found to be especially effective for use as a filter bed according to my invention, is the ordinary rock wool or mineral wool of commerce, which is obtained by mechanically processing naturally occurring silicious rocks. Some alkali metal or metals are also present in combined form in the rock wool. Another complex silicate useful for the purpose at hand is exploded mica of commerce. These materials are preferably employed in the form of granular particles, in the case of exploded mica; and as a fibrous material, in the case of rock wool, and in this form gives a filter bed that is readily permeable to magnesium vapor. The filter bed made of these materials should be from one-half to two inches or more in thickness to produce the most effective purification. The material employed is preferably one that is a solid at the temperature and conditions of operation. It is generally desirable to renew the filter bed after each run, since the materials tend to become soft and crumble easily after being heated to the temperature required for the operation of the process.

The purifying effect produced by passing the vaporized metal through a bed of these silicates appears to be due partly to some chemical action between the impurities and the silicates, as well as due to the filtering action. This is evidenced by the fact that by merely adding a quantity of rock wool to a charge of impure magnesium, and thereafter distilling or subliming the magnesium, a product of greater purity is obtained than can be obtained by just distilling impure magnesium. Thus merely bringing the vaporized magnesium into contact with the filtering or purifying medium suffices to yield a purified condensate.

It is usually desirable to operate under a relatively high vacuum, as for example, less than 2 millimeters of mercury and preferably below 0.2 of a millimeter, since under such highly reduced pressure the purified magnesium condenses out in the form of a dense compact mass rather than in the form of long needle-like crystals. Condensation in a dense compact form is desirable because relatively little surface area is exposed to oxidation when the metal is later handled for remelting or the like, in comparison with the area exposed when a needle-like crystal structure is produced. Operating at highly reduced pressure offers the additional advantage that a much lower temperature may be employed to carry out the process, and as a result the apparatus may be constructed of readily available iron or steel without any danger of destructive effect due to high temperatures otherwise necessary. If desired, a suitable inert gas may be introduced into the retort, although under the preferred vacuum conditions such procedure is unnecessary to prevent attack upon the purified metal.

The temperature to be employed in the distillation or sublimation may, of course, be varied quite widely, as for example, between about 500° to 800° C., depending, however, upon the degree of vacuum employed. At 0.05 millimeter of pressure a temperature of 700° C. has been found highly satisfactory. Depending upon the temperature-pressure relationship employed, the magnesium may either melt and pass from a liquid into the vapor state or may pass directly from the solid state into a vapor, thus subliming instead of distilling.

The time required to purify a batch of metal also depends upon the amount of heat supplied to the metal, as well as the pressure employed. In a retort such as is illustrated, 16 inches in diameter, it is possible to sublime from 3 to 4 pounds of magnesium per hour by holding the temperature at 700° C. and the pressure at 0.05 millimeter.

Other modes of applying the principle of the invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method of producing substantially pure magnesium comprising heating impure magnesium under reduced pressure so as to vaporize the magnesium, and passing the magnesium vapor through a filter bed comprising a complex silicate capable of liberating an alkali metal in the form of a vapor upon contact with magnesium vapor, prior to condensing the magnesium so vaporized.

2. The method of producing substantially pure magnesium comprising heating impure magnesium under a pressure of less than 2 millimeters of mercury so as to cause magnesium vapor to form, and passing the vapor so formed through a filter of a complex silicate capable of liberating an alkali metal in the form of vapor upon contact with magnesium vapor.

3. The method of producing substantially pure magnesium comprising heating impure magnesium at a temperature between about 500° and 800° C. under reduced pressure, and passing the vapor through a porous filter composed of rock wool capable of liberating an alkali metal in the form of a vapor upon contact with magnesium vapor.

4. The method of producing substantially pure magnesium comprising heating impure magnesium at a temperature between about 500° and 800° C. under reduced pressure, and passing the vapor through a porous filter composed of exploded mica capable of liberating an alkali metal in the form of a vapor upon contact with magnesium vapor.

CHARLES E. NELSON.